Jan. 1, 1952     F. C. MOCK     2,581,275
FUEL FEED RESPONSIVE TO AIR PRESSURE AND TEMPERATURE, FUEL
FLOW, AND SPEED FOR GAS TURBINES
Filed Oct. 9, 1944     2 SHEETS—SHEET 1
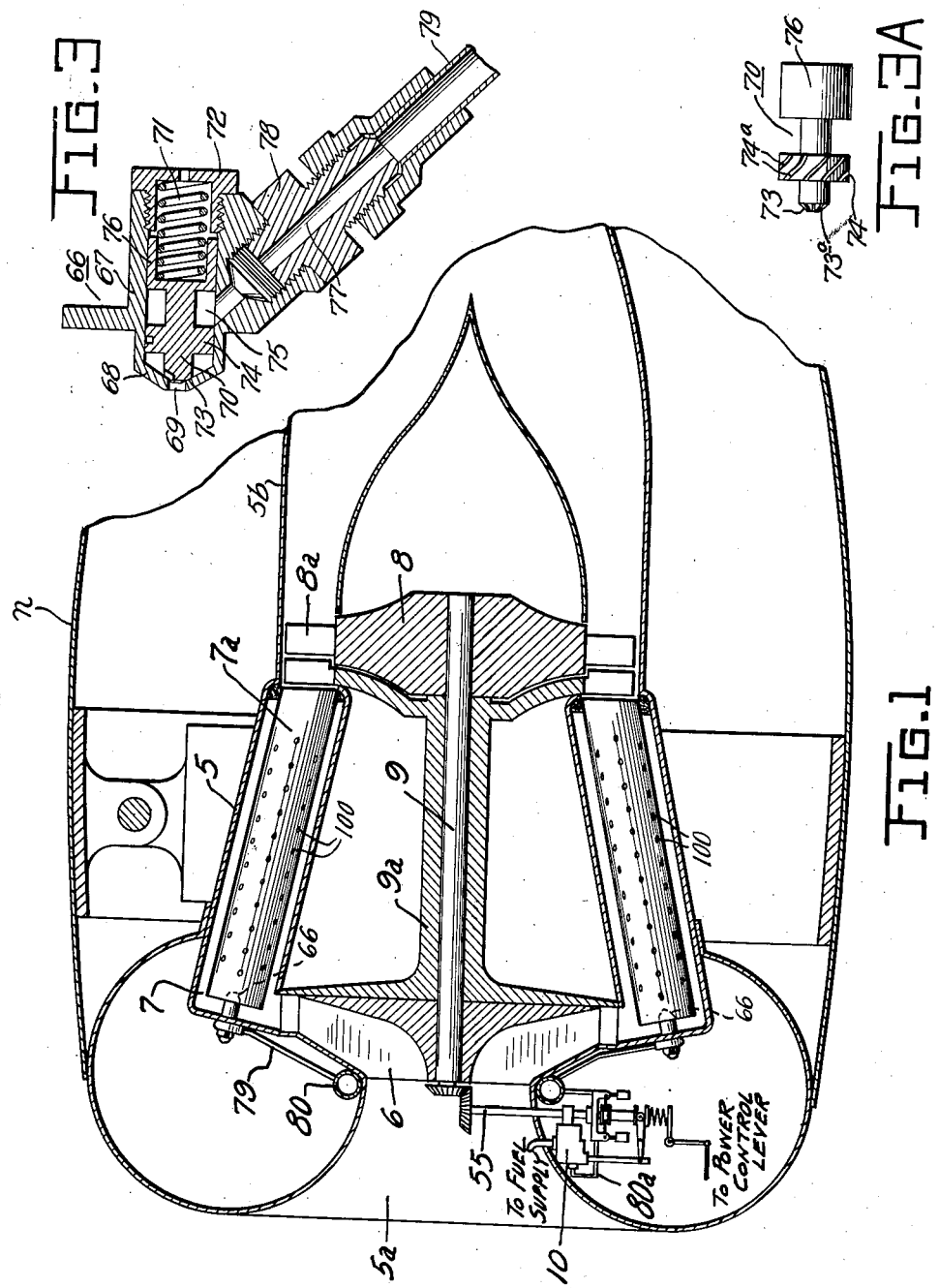
INVENTOR.
FRANK C. MOCK
BY
ATTORNEY Jan. 1, 1952　　　　　　　　F. C. MOCK　　　　　　　2,581,275
FUEL FEED RESPONSIVE TO AIR PRESSURE AND TEMPERATURE, FUEL
　　　　　　　　　　FLOW, AND SPEED FOR GAS TURBINES
Filed Oct. 9, 1944　　　　　　　　　　　　　　　　　2 SHEETS—SHEET 2
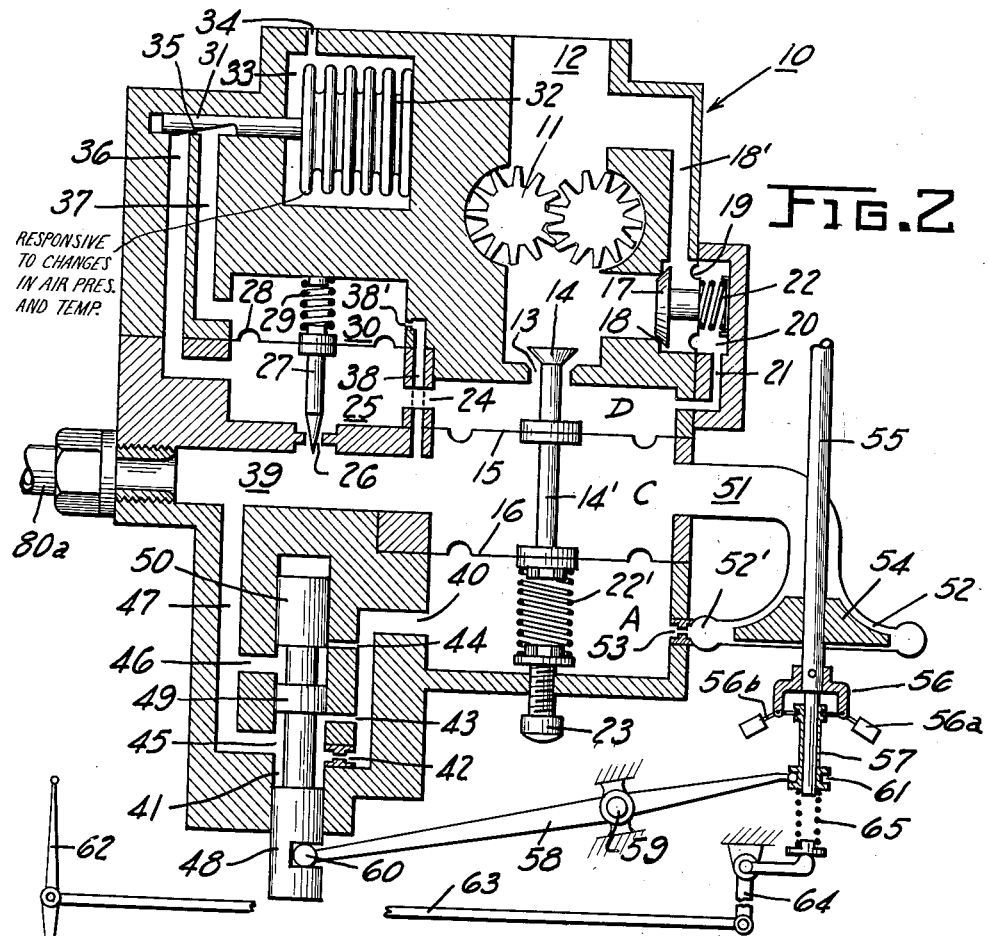
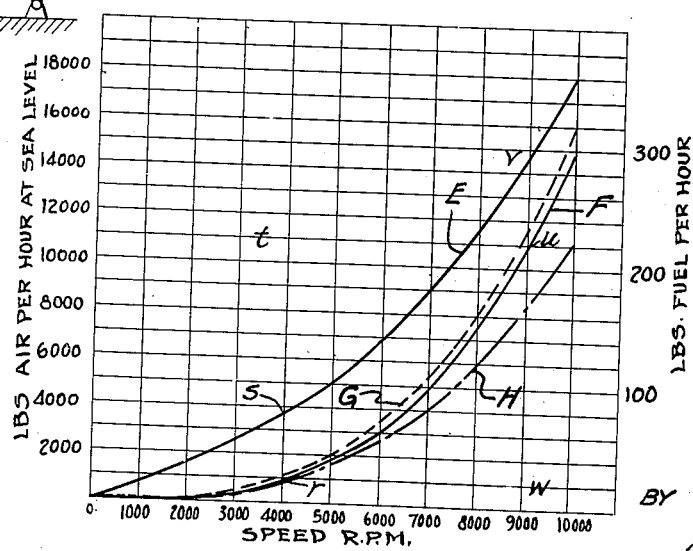
INVENTOR.
FRANK C. MOCK
BY
ATTORNEY Patented Jan. 1, 1952

2,581,275

UNITED STATES PATENT OFFICE 2,581,275

FUEL FEED RESPONSIVE TO AIR PRESSURE AND TEMPERATURE, FUEL FLOW, AND SPEED FOR GAS TURBINES

Frank C. Mock, South Bend, Ind., assignor to Bendix Aviation Corporation, South Bend, Ind., a corporation of Delaware Application October 9, 1944, Serial No. 557,812

26 Claims. (Cl. 60—39.28)

This invention relates to a fuel feed and power control system for gas turbines, jet propulsion engines and like power plants utilizing the force or energy produced by the combustion and expansion of precompressed air; it is particularly adapted for jet propulsion power plants for aircraft wherein the air is compressed into a chamber constituting part of a generator, at which point it is heated by the combustion of fuel, and the air and products of combustion passed through a turbine for driving a compressor and then discharged through a reaction jet to propel the aircraft; and for power plants for aircraft wherein a gas turbine drives the propeller of the aircraft and may also drive a compressor for supplying air to a combustion chamber or generator.

An object of the invention is to provide an improved fuel feed and power control system for motive units and power plants of the type specified.

Other objects include:

The provision of a fuel feed and power control system wherein an upper limit is automatically placed on the acceleration or fuel feed curve to hold the temperature of the expanded gases within a predetermined safety range, and a lower limit is in a like manner placed on the deceleration curve to avoid leaning out beyond flame propagation, or to a point where the burner goes out;

A system for the purpose specified which will ensure a predetermined smooth supply of liquid fuel to a burner in proper ratio to the air compressed in the burner and in accordance with power requirements, or at all positions of a power control lever;

A system of the type specified wherein liquid fuel is metered to a burner in relation to power requirements of the engine without waste while at the same time ensuring sufficient fuel to maintain flame propagation at low power and idle speed settings of a control lever;

A fuel feed and power control system particularly adapted for jet propulsion engines or power plants of the gas turbine type wherein control of power may be had by regulation of the liquid fuel supply without requiring adjustment of the air supply, exhaust gases or other factors which might result in a temporary loss of power;

A fuel feed and power control system for aircraft jet propulsion engines or gas turbines which will maintain a predetermined fuel/air ratio in the burner at varying air densities and hence at varying altitudes and temperature conditions;

A system of the type specified which is of relatively simple construction and operation;

And to otherwise improve the fuel-feeding characteristics of power plants utilizing the energy of gases expanded by the addition of fuel and combustion in a burner or combustion chamber.

The foregoing and other objects and advantages will become apparent in view of the following description taken in conjunction with the drawings, wherein:

Figure 1 is a substantially central longitudinal sectional view of a jet propulsion power plant or engine incorporating the fuel feed and power control system of the present invention;

Figure 2, a view in section and to some extent diagrammatic of the fuel metering and power control unit;

Figure 3, a central longitudinal section of one of the fuel nozzles;

Figure 3a, a view in side elevation of the valve member for the nozzle of Figure 3; and Figure 4, a curve chart illustrative of the operation of the improved system.

The power plant shown in Figure 1 is mounted in a suitable enclosure such as the engine nacelle of an airplane, indicated at N, and includes an outer casing 5, flared at its front extremity to define an air inlet 5a and contoured at its rear extremity to define a reaction tube 5b, said casing having mounted therein a dynamic or rotary air compressor 6 which forces air into a generator chamber 7 containing a plurality of burner units 7a arranged to direct the hot air and products of combustion against the turbine blades 8a of a turbine rotor 8. The turbine rotor and air compressor are mounted on a common shaft 9 supported for rotation by bearing 9a. Air entering the inlet 5a is picked up by the compressor, which acts to compress the air into chamber 7 and thence into combustion chambers 7a, where heat is added by the combustion of fuel and the expanded gases directed through the blades of the turbine rotor to drive the compressor and are then discharged to the atmosphere through the reaction tube 5b (and an exhaust nozzle, not shown) to effect propulsion of the plane.

Referring now to Figure 2, the fuel metering and power control unit 10 comprises a suitable housing or casing having mounted therein a fuel pump 11 which takes fuel from a suitable supply such as a fuel tank, not shown, through a fuel flow conduit 12 and delivers it to unmetered fuel chamber D through valve port or orifice 13 controlled by poppet valve 14, the stem 14' of which is connected to the center plates of diaphragms 15 and 16.

A relief valve 17 controls by-pass port 18 and channel 18' leading back to the inlet portion of conduit 12; said valve being mounted on a diaphragm 19 overlying a chamber 20 which is vented to unmetered fuel chamber D by means of duct 21, the valve 17 being urged closed by a spring 22. The effective area of diaphragm 19 is substantially the same as that of valve 17, and hence the drop across port 13, which is determined by the strength of spring 22, will always be substantially constant. Since the drop across port 13 is maintained substantially constant, the force on stem 14' caused by the differential pressure across the poppet valve 14 may be balanced, or slightly overbalanced or underbalanced if desired, by mechanical means such as spring 22' backed up by adjusting screw 23.

Unmetered fuel from chamber D flows through a relatively large orifice 24 into metering chamber 25 and thence through metering orifice 26 controlled by metering needle or valve 27 connected to diaphragm 28 and urged toward closed position by a spring 29 in chamber 30.

The differential pressure across diaphragm 28 is varied in relation to entering air density, viz., changes in pressure and/or temperature of the air flowing to the engine by means of a valve 31 connected to a capsule 32, which is responsive to changes in pressure and temperature and is mounted in a chamber 33 which may be vented to the atmosphere at 34 or, if desired, to any other reference pressure. Valve 31 controls by-pass port 35 communicating passage 36 from chamber 25 with passage 37 leading to chamber 30. Chamber 30 has flow communication with chamber C by means of channel 38 having a calibrated restriction or bleed 38' of predetermined flow capacity therein.

At standard ground level barometric pressures and temperatures, assuming a given engine speed the area of by-pass port 35 with respect to bleed 38' is such that the drop across diaphragm 28 is at a maximum, but as density of the air decreases, capsule 32 extends itself and the area of port 35 increases and the drop across said diaphragm decreases. The manner in which this regulates fuel flow in relation to entering air density will be more fully explained in the description of operation of the system.

Liquid fuel flowing through metering orifice 26 passes into discharge conduit 39 (which constitutes a continuation of fuel flow passage or conduit 12) on its way to the burner discharge nozzles; it also fills chamber C and then chamber A, the latter being in controlled communication with passage 39 by means of channel 40 having a plurality of branches opening into valve chamber 41 and provided with restricted orifices or bleeds 42, 43 and 44 of predetermined flow capacity. Spaced ports 45 and 46 and channel or passage 47 communicate the said valve chamber with the discharge conduit 39. A valve in the form of a piston 48 is mounted for sliding movement in chamber 41 and is provided with lands 49 and 50 adapted to cover or uncover orifices or bleeds 43 and 44. Valve piston 48 is operated in a manner to be described.

A passage 51 leads from chamber C into impeller chamber 52, the latter communicating with chamber A through restriction 53. A centrifugal impeller 54 is mounted in chamber 52 on a shaft 55 having a geared drive connection with the turbine and compressor shaft 9 as illustrated in Figure 1. Thus the impeller 54 is driven in direct relation to turbine and compressor speed and will produce a pressure differential between chamber C and the periphery 52' of the impeller chamber 52 proportional to the square of such speed, or the square of engine speed, the word "engine" as used herein meaning the power plant including the turbine and compressor; and since the arrangement is such that for a given position of needle 27 and piston 48 the pressures in chambers A and D are equal or proportional, the differential between chambers D and C will vary as engine speed squared.

Secured on shaft 55 and rotating therewith is a governor 56 including weights 56a which act on bell-crank levers 56b to control the position of a sleeve 57 slidingly mounted on said shaft. A lever 58 is pivotally supported or fulcrummed at 59, and at its one end said lever is provided with a ball head or bearing 60 engaging in a recess provided in the outwardly-projecting extremity of valve piston 48, and at its opposite end the lever is forked and engages in a groove 61 defined by spaced collars formed on sleeve 57.

A single power control lever 62 connects through link 63 and bell-crank lever 64 with the outer free end of a spring 65 which bears at its inner end against the adjacent end of sleeve 57.

Metered fuel from conduit 39 is discharged into the individual burner chambers (Figure 3) through a plurality of spray nozzles 66, an example of which is shown in detail in Figures 3 and 3a. The nozzle illustrated in Figs. 3 and 3a consists of a flanged supporting body 67 which is suitably secured to the burner ring and has a nose 68 formed with a discharge orifice 69. A valve member 70 is mounted for sliding movement in the body 67 and is normally urged to seated position by a spring 71 whose tension may be adjusted by retainer nut 72. The valve member 70 has a tapered end 73 adapted to seat against the orifice 69 and formed with a series of spiral grooves 73a; and back from said end 73 is an annulus 74 formed with a series of spiral grooves 74a which coact with but are of greater flow capacity than the grooves 73a. An inlet chamber 75 is defined by the annulus 74 and rear enlargement 76, and fuel is supplied to this chamber by way of passage 77 formed in an enlargement of the body 67 and adapted to receive a threaded fitting 78 to which a tube or conduit 79 is attached, the latter being connected to a header or intake manifold in the form of a ring 80 which is common to the respective nozzles, note Figure 1, and in turn receives fuel from the metered fuel passage 39 by way of conduit 80a.

At low fuel pressures, the valve member 70 remains seated and discharge of fuel is through the spiral end grooves 73a, which grooves are relatively fine or small and cause the fuel to be discharged at increased velocity and in a swirling spray. As pressure of the fuel increases, the valve member moves back and discharge is by way of the spiral grooves 74a and orifice 69, the swirling action still being maintained while the cone or diffusing action varies. The flow capacity of the grooves 74a will determine the discharge capacity of the nozzle unless clearance is provided between the annulus 74 and adjacent wall of the nozzle chamber. Improved fuel spraying or atomization at all pressures, a variable spray cone or diffusion angle and elimination of separate low pressure nozzles and connections therefor are some of the advantages of the nozzle.

To assist in an understanding of the operation, the following is submitted:

When a dynamic compressor is connected to and rotated in synchronism with a gas turbine driven by the energy of expanded gases produced in a combustion chamber or burner in which the air is compressed, certain fundamental relations exist. Thus, at a given entering air density the weight of air flowing will vary approximately with the R. P. M., the pressure of compression will vary approximately with the R. P. M. square, and the power required for compression and the accompanying air flow will vary approximately with the R. P. M. cube. When the power is controlled by regulation of the fuel feed, the rate of feed required will vary approximately as the R. P. M. cube; or in other words, if the fuel feed is selected, the turbine speed will either increase or decrease until the speed corresponding to the selected fuel feed is obtained. Substantially the same considerations are present when a gas turbine drives an aircraft propeller, and the burner for the turbine receives air from a forwardly disposed opening.

Control of power by regulation of fuel feed tends towards simplicity, but even so there are certain limitations which should be observed. Thus, the turbine and compressor rotational system must not exceed a speed beyond which centrifugal strains and breakdown result; the fuel and air mixture must be held to a ratio where the resultant flame temperature will not damage the turbine blades or other parts lying in the path of the hot expanded gases; and conversely, the ratio of fuel to air should not be leaned down to a point below flame propagation and resultant failure of the burner.

Coming now to the actual operation of the fuel feed and power control system as herein disclosed, the engine or power plant may be started in any known manner, as by an electric starting motor having a geared connection with the main drive shaft, to start the burner and bring the turbine up to a speed where it will accelerate without outside help. The metering unit would ordinarily be filled with fuel, but assuming it to be empty, the differential across diaphragms 15 and 16 will be zero and when the fuel pump 11 starts, chambers D, C and A will fill in successive order and fuel will also pass through the conduit 39 and header 80 to the respective discharge nozzles 66, and discharge to the burner begins. For the idling power range, the differential across diaphragm 15 will be at a minimum and hence the metering head will be such as to discharge just enough fuel to maintain flame propagation in the burner. The initial charge of fuel may be ignited by a sparking circuit, pilot flame or in any other known manner.

Impeller or centrifugal pump 54 operates at a fixed ratio of speed with respect to the speed of the turbine and compressor, and hence it will produce a pressure differential between chamber C and the peripheral chamber 52' substantially proportional to the square of turbine or engine speed, and if the pressure in chamber A is equal to that at 52', then the pressure differential between chambers A and C acting on diaphragm 16 will so control valve 14 that for a given position of needle 27, on a given entering air density the differential pressure between chambers D and C will be substantially proportional to the square of engine speed. The diaphragms 15 and 16 are preferably of equal effective area, hence the pressure in chamber C will be balanced with respect to chambers A and D, and any change in pressure in chamber A will vary the pressure differential across said diaphragms and will correspondingly increase or decrease the drop across valve 14. If the pressure in chamber A is increased, valve 14 will move toward open position, increasing the fuel flow, and if such pressure is decreased, the valve will move toward closed position, decreasing the fuel flow.

The pressure differential between chambers D and C is imposed across metering orifice 26, and since this differential is proportional to the square of engine speed, the velocity of flow through the orifice will be proportional to the square root of this differential, or to the speed directly.

The area of metering orifice 26 is subject to variation by needle 27, the position of which is determined by the differential across diaphragm 28; and since this differential is proportional to that between chambers D and C, or across diaphragm 15, the position of the needle and hence the metering area and volume fuel flow will constitute a function of engine speed. By suitably contouring or modifying the shape of needle valve 27, the volume flow through orifice 26 can be made proportional to the cube of engine or turbine speed, and in fact it can be contoured to produce any other type of fuel flow curve in relation to speed. Preferably, it is contoured to produce a curve proportional to the cube of engine speed.

To accelerate the engine, or stated in another way, to increase the speed of the turbine and raise the propulsive power at the discharge jet of the engine, the power control lever is moved in a direction to compress spring 65 and urge sleeve 57 upwardly as shown in Figure 2 thereby moving piston valve 48 down and closing or reducing the flow capacity of orifice or bleed 43. This will result in an increase in pressure in chamber A and hence D, thereby increasing the metering differential or head and the flow of fuel to the burner. When the speed of the turbine increases to a point where the force of the governor weights 56a balance the new setting of spring 65, piston valve 48 will move up and uncover orifice or bleed 43. Any tendency of the turbine to vary from a given speed at a given setting of spring 65 and hence the power control lever will result in immediate correction through piston valve 48.

To decelerate, the power control lever is moved in a direction to relieve the tension on spring 65, sleeve 57 will then move down and piston valve 48 up, uncovering orifice or bleed 44; whereupon the pressure in chamber A will be reduced, thereby reducing the metering differential, and the resultant fuel flow will be too lean to supply the power required to run the engine at the previous setting, and the speed will be reduced until the governor weights balance the new spring setting and piston valve 48 moves to the left covering orifice or bleed 44.

It will be noted that while any change in the total area of restricted orifices or bleeds 42, 43 and 44 varies the effective position of valve 14, the pressure differential between chambers A and C remains a function of the square of the speed of impeller 54 and hence turbine or engine speed. By selecting orifices or bleeds 42, 43, 44 and 53 of a predetermined area, the fuel flow curves during acceleration and deceleration can likewise be predetermined and properly adjusted with respect to air flow to define an upper limit of flame temperature and speed and a lower limit of leanness irrespective of how quickly the power control lever may be advanced or retarded.

In Figure 4 an attempt has been made to diagrammatically illustrate the fuel and air flow characteristics of a jet propulsion engine equipped with a fuel feed and control system in accordance with the invention. The upper curve E indicates the weight of air pumped by the compressor at a fixed altitude (such as standard sea level barometric pressure and temperature) over a speed range from zero to 10,000 R. P. M. This curve can be assumed fixed, the air being pumped at a given altitude being inherently fixed or determined at each engine speed. The curve F represents the pounds of fuel per hour which is required to run the engine at steady speeds or at any given setting of governor 56. This curve is likewise an inherent characteristic for the engine, and selection of a given fuel flow will cause the engine to speed up or slow down until a speed corresponding to that fuel flow is attained, and the air being pumped to the engine is correspondingly determined. For all normal steady speed operation, the air consumption is greatly in excess of that needed for combustion of the fuel fed, and the temperature of the burned gases follows the fuel air ratio.

Curve G represents the metering characteristic of the control unit of Figure 2 with variations in engine speed when valve 48 is down sufficiently to close orifices or bleeds 43 and 44. This curve for convenience may be referred to as the "acceleration envelope," since it provides throughout the speed range a fuel flow characteristic slightly greater than the inherent fuel flow requirement for equilibrium operation of the engine and will therefore cause the engine to accelerate. Under these conditions of operation, the fuel flow to the burner is confined by the regulator to follow curve G. This prevents the mixture from becoming too rich at any speed, a condition which otherwise would greatly increase the gas temperatures at the turbine blades, due to subnormal air flow, while waiting for the turbine to speed up after the fuel flow had suddenly been increased.

Curve H represents the metering characteristics of the control unit of Figure 2 with variations in engine speed when valve 48 is up sufficiently to open orifices or bleeds 43 and 44. This curve for convenience may be referred to as the "deceleration envelope" since it provides throughout the speed range a fuel flow characteristic slightly less than the inherent fuel flow requirement for equilibrium operation of the engine and will therefore cause the engine to decelerate. Under these conditions of operation the fuel flow to the burner is confined by the regulator to follow curve H. This prevents the mixture from becoming too lean to maintain flame propagation during deceleration, as would be the case while waiting for the turbine to slow down if the fuel flow had been suddenly decreased.

During equilibrium operation the governor 56 will position the valve 48 intermediate a position at which orifices or bleeds 43 and 44 are both closed and a position at which the orifices or bleeds are both open, and will thus select the necessary fuel flow for equilibrium operation.

To better illustrate the advantages resulting from controlled acceleration and deceleration, a comparison can be made with a system wherein fuel feed is regulated simply by an operator controlled needle valve or throttle. With such type of control, if the engine were operating steadily at 4,000 R. P. M. the fuel flow would correspond to that at point r and the air flow to that at point s. If now the fuel throttle were advanced to a point corresponding to the fuel required for 9,000 R. P. M. operation, the fuel flow would immediately increase to the higher value illustrated by point t and would then remain constant as the engine speeded up until operation would be at a point corresponding to point u. As the engine speed increased the air flow would advance along curve E from s to v. During this period the excess air being mixed with the products of combustion in the combustion chamber would be so deficient that the temperature of the gases reaching the blades of turbine wheel 8 would be greater than the maximum safe limit and the turbine blades would quickly deteriorate.

On the other hand, if the engine were operating at condition u and the fuel throttle were closed to decelerate to r, the fuel flow would decrease almost instantly to point w but the high air flow would be maintained until inertia and friction permitted the engine to slow down. Thus the mixture would be extremely lean and the burner flame would probably fail.

With the type of fuel feed and control system herein disclosed, fuel feed is in relation to speed, and since the weight of air flowing varies with speed, the fuel feed is never more than a predetermined amount greater or less than the value for equilibrium operation, whereby the fuel-air ratio is prevented from becoming excessively rich or excessively lean. Thus if while operating at 4,000 R. P. M. the lever 62 is moved to the right to a position corresponding to 9,000 R. P. M. operation, the spring 65 is compressed which rotates lever 58 counter-clockwise and moves valve 48 downwardly to close orifices or bleeds 43 and 44. The fuel flow jumps from point r upwardly to curve G and thereafter advances along curve G as the engine accelerates. As the engine approaches a speed of 9,000 R. P. M. the governor weights 56a will begin to overcome the force of spring 65. The valve 48 will gradually move upwardly uncovering a sufficient portion of orifices or bleeds 43 and 44 to effect a reduction in the rate of fuel flow from curve G to point u as an engine speed of 9,000 R. P. M. is attained.

If the lever 62 is now returned to its 4,000 R. P. M. position, the relieved force of spring 65 allows the governor weights to fly outwardly thereby moving the valve 48 upwardly to uncover orifices or bleeds 43 and 44. This causes the fuel flow to drop from point u to a point directly below it on curve H, after which the fuel flow will decrease along curve H as the engine slows down. As a speed of 4,000 R. P. M. is approached the weights 56a will drop, moving valve 48 downwardly and covering a sufficient portion of orifices or bleeds 44 and 43 whereby the fuel flow at point r is selected when a 4,000 R. P. M. speed is attained. It will be obvious that a single orifice or bleed could be used in place of orifices or bleeds 43 and 44.

To obtain a positive governor action, the governor 56 and valve 48 may be correlated in a manner such that when the governor acts to cut off the fuel as the end of acceleration as determined by the setting of lever 62 is approached, and at which time the engine speed is still increasing, the cut-off rate as determined by the position of the valve 48 is markedly greater than the simultaneous rate of increase resulting from the action of the centrifugal pump 54 on the poppet valve 14.

From the foregoing it will be apparent that applicant's control provides acceleration and deceleration fuel curves varying as a function of speed which envelop the inherent fuel flow vs. speed characteristic of the power plant for equilibrium operation, and includes a speed responsive device and/or a manual control for selecting either the acceleration or deceleration enveloping curve or any condition of fuel flow therebetween in order to obtain controlled acceleration and deceleration as well as equilibrium operation. Since in applicant's device, the differential pressure across orifice 26 varies with variations in engine speed and the needle 27 is positioned and therefore varies the orifice area as a function of speed, any desired speed vs. fuel quantity characteristic can be obtained for the acceleration and deceleration enveloping curves. Thus they can be made to vary as the square or the cube or as any power of the speed, or they can be made to vary along an irregular curve. Thus the optimum conditions of total fuel-air ratio for best acceleration and deceleration can be selected for any power-plant having a predetermined fuel flow vs. speed characteristic for equilibrium operation.

If the unit is used on an engine or power plant wherein varying air densities are encountered, fuel flow will also become a function of mass air flow. In the position of the capsule 32 shown in Figure 2, the density is assumed to be that existing at ground level, the port 35 being restricted to a point where the bleed 38' is of maximum effect. However, as the density of the air decreases and the capsule extends itself, the port 35 becomes enlarged and the effect of the bleed 38 decreases, whereupon the pressure in chamber 30 rises and the differential across the diaphragm 28 decreases, thereby reducing area of opening at 26, and leaning the mixture. By proper size of restriction 38' and contour of the needle 31, any desired fuel flow with relation to changes in density may be obtained.

It will be noted that by the cooperation of the air pressure and temperature automatic adjustment, the governor mechanism need operate over only a relatively short range, since the position it assumes to obtain a given speed is substantially the same at all altitudes. Thus, its flight action will accordingly be both more sensitive and more accurate.

The burner of Figure 3 is shown in this application simply as an example of a type of burner that may comprise part of the engine of Figure 1, all patentable features of the burner being claimed in my copending application Serial No. 640,018, filed January 9, 1946.

It will be understood that no attempt has been made herein to define all of the metering characteristics of which the fuel feed and control unit is capable, and it will also be obvious that the drawings are simply illustrative of the invention and that in actual practice changes in the arrangement and construction of parts will be necessary to adapt the unit to different installations, all such changes and modifications falling within the scope of the invention as defined by the appended claims.

I claim:

1. In a fuel feeding system for a combustion type gas turbine or like power-plant, a fuel conduit, means for controlling the fuel flow through the conduit as a function of the speed of the turbine, means for varying the fuel quantity vs. speed relation between a predetermined upper acceleration limit and a predetermined lower deceleration limit, a device responsive to variations in turbine speed for actuating the varying means, and means for varying the speed responsiveness of said device.

2. In a system for controlling the rate of fuel feed to a gas turbine engine, a fuel conduit having a metering orifice therein, means for regulating the area of said orifice and means for regulating the pressure differential across said orifice, a power control member operatively connected to one of said means and adjustable to different positions to select the rate of fuel feed and thus obtain a given engine speed, and a device connected to the other of said means and functioning to establish a predetermined fuel quantity vs. engine speed characteristic during a transitional speed change at a fixed position of said power control member following a change in adjustment of said member.

3. In a system for feeding fuel to the burner of a gas turbine engine, a conduit for supplying metered fuel to the burner, a metering restriction in the conduit, means for regulating the pressure drop across the restriction, and means for automatically increasing the effective area of the restriction with an increase in engine speed.

4. In a system for feeding fuel to the burner of a gas turbine engine, a spray nozzle for said burner, a fuel conduit leading to said nozzle and having a feed restriction therein upstream of the nozzle, means driven in relation to engine speed arranged to automatically produce an increase in the rate of flow through said restriction with an increase in engine speed, and means responsive to changes in the pressure and/or temperature of the air flowing to the burner arranged to automatically modify the rate of increase.

5. In a system for controlling the rate of fuel feed to the combustion chamber of a gas turbine engine, a nozzle adapted to discharge fuel into said chamber, a fuel conduit for conducting fuel to said nozzle having a fuel metering orifice therein in series with the nozzle, power control means including a member adjustable to select the rate of flow through said orifice, and means operable automatically as a function of existing engine speed and coacting means operable automatically as a function of the temperature of the air flowing to the engine functioning to maintain the rate of flow through said metering orifice within predetermined limits during a transition of engine speed at a fixed position of said power control member following a change in setting of said member.

6. In a system for controlling the rate of fuel feed to a gas turbine engine, one or more fuel discharge nozzles, a fuel conduit for conducting fuel under pressure to said nozzles having a metering orifice therein upstream of the nozzles, means for regulating the area of said orifice, means for regulating the pressure differential across said orifice, power control apparatus operably connected to one of said means including a member movable to different positions to adjust the rate of fuel feed to obtain a desired engine speed, a pressure responsive device connected to the other of said means, and means for subjecting said device to a differential pressure varying as a function of engine speed and the pressure and/or temperature of the air flowing to the engine during a transitional speed change at a fixed position of said member following a change in setting of the latter.

7. In a system for controlling the flow of fuel to a gas turbine engine, power control means including a member adjustable to different positions to select an operating speed by establishing a predetermined rate of fuel feed, and means operable automatically to cause the feed to vary at a predetermined rate as a function of engine speed and coacting means also operable automatically to cause said rate to vary approximately directly with changes in pressure and/or inversely with changes in temperature of the air flowing to the engine during a transition of engine speed at any fixed position of said member following a change in setting of the latter.

8. In a system for supplying liquid fuel to the burner of a gas turbine engine, a fuel flow conduit having a metering restriction therein, manually adjustable means for varying the flow through said restriction to select an operating speed for the engine, means responsive to an increase in engine speed for automatically increasing flow through said restriction upon an increase in engine speed, and an engine speed responsive device associated with said manually operable means for automatically effecting a decrease in flow through said restriction upon the speed of the engine increasing to a value approximating the selected speed.

9. In a fuel feed control device for a gas turbine engine, a fuel conduit having a metering orifice therein, means for varying the area of said orifice, means for varying the differential pressure across said orifice, a variable speed governor controlling one of said means and adjustable to select the desired engine speed and also functioning to maintain the engine in equilibrium at the selected speed, and means for automatically adjusting one of said means to maintain safe limits of fuel feed during transition of engine speed in the time interval following a new setting of the speed governor and the time at which corresponding equilibrium of engine speed is attained.

10. A fuel feed control as claimed in claim 9, wherein means are provided for modifying the action of one of said means as a function of changes in pressure and/or temperature of the air flowing to the engine.

11. In a system for controlling the rate of fuel feed to a gas turbine engine, one or more fuel discharge nozzles, a fuel conduit for conducting fuel under pressure to said nozzles and having a metering orifice therein upstream of the nozzles, means for regulating the rate of flow through said orifice, power control apparatus operatively connected to said flow regulating means and including an adjustable engine driven governor and a control member movable to different flow regulating positions to select an operating speed for the engine and simultaneously set said governor to maintain the fuel feed rate and engine speed in equilibrium when a selected speed is attained, and means operable automatically to maintain the rate of fuel flow through said orifice within predetermined limits as a function of the pressure and/or temperature of the air flowing to the engine during a transition of engine speed at a fixed position of said control member following a change in setting of said member.

12. In a system for controlling the rate of fuel feed to a gas turbine engine, one or more fuel nozzles adapted to discharge fuel continuously while the engine is in operation, a fuel control device, a fuel supply pump for pressurizing fuel to and through said control device and nozzle or nozzles; said device including adjustable fuel governor means for maintaining a selected engine speed, control means for adjusting said governor speed and adapted to be reset to different positions to select an engine operational speed, means operable automatically as a function of existing engine speed to maintain the rate of discharge effected by said nozzle or nozzles within predetermined limits during a transition of engine speed at a fixed position of said control means following a change in setting of said latter means, and means for automatically modifying the rate of transitional fuel feed as a function of changes in pressure and/or temperature of the air flowing to the engine.

13. In a system for supplying liquid fuel to the burner of a gas turbine engine, a fuel flow conduit having a metering restriction therein, means for varying the flow through said restriction to select an operating speed for the engine, an engine driven governor associated with said means for automatically maintaining the engine at the selected speed, and means responsive to changes in the pressure and/or temperature of the air flowing to the engine for modifying the flow through said restriction.

14. A fuel control for a combustion type gas turbine engine or like power plant comprising a fuel conduit, a metering orifice in the conduit, the flow of fuel through said orifice being dependent is known manner upon two variables, namely, the area of the orifice and the differential pressure across the orifice, means responsive to variations in engine speed for controlling one of said variables to provide an increasing rate of fuel supply to the turbine burner with increase in engine speed, engine driven means becoming effective at a predetermined selectable engine speed to adjust one of said variables to maintain a selected operating speed, and means responsive to variations in pressure and/or temperature for controlling one of said variables.

15. In a system for feeding fuel to the burner of a gas turbine wherein air is supplied to the burner in relation to the speed of the turbine, a fuel conduit for conducting liquid fuel to the burner having a metering restriction therein, means for automatically maintaining a metering head across said restriction varying with variations in turbine speed, a variable speed governor and fuel control means associated therewith arranged to vary the rate of fuel feed at any given turbine speed, a power control member for adjusting said governor to select an operating speed, said governor functioning to automatically adjust the feed of fuel when the turbine varies from the selected speed, and means responsive to changes in the pressure and/or temperature of the air flowing to the burner arranged to automatically adjust the rate of fuel feed to engine speed at any given governor setting.

16. In a system for controlling the rate of fuel feed to a gas turbine engine, one or more fuel discharge nozzles, a pump for supplying fuel under pressure to said nozzles, a fuel conduit communicating said pump with said nozzles, a fuel metering orifice in said conduit between the nozzles and supply pump, means for varying the effective area of said orifice, means for regulating the pressure drop across the said orifice, an element responsive to engine speed arranged to regulate one of said means to automatically increase the fuel flow through the orifice upon an increase in speed, a power control device arranged to adjustably regulate the other of said means, and means operatively associated with the power control device and becoming effective automatically to reduce the fuel flow when a selected engine speed is exceeded.

17. In a system for feeding fuel to the burner of a gas turbine engine having a compressor, a fuel conduit having a feed restriction therein, means for adjusting the rate of fuel feed to select an operating speed for the engine, means driven in relation to engine speed arranged to automatically maintain an increase in the rate of fuel flow through said restriction as a function of engine speed, automatically operating means adapted to also maintain an increase in the rate of flow through said restriction in approximately direct proportion to change in pressure and/or temperature of the air entering the compressor, and means automatically becoming effective to reduce the rate of fuel feed when a seletced engine speed is exceeded.

18. In a system for supplying liquid fuel to the burner of a gas turbine engine, one or more fuel discharge nozzles, a pump for supplying fuel under pressure to said nozzles, a fuel conduit communicating said pump with said nozzles and having a metering restriction therein upstream of the nozzles, adjustable valve means for varying the flow through said restriction, manual means for adjusting said valve means to select an operating speed for the engine, an engine driven mechanical governor operatively connected to said valve means for automatically adjusting the latter to maintain a selected engine speed, said governor being provided with a tensioning spring adapted to be reset by said manual means, and means responsive to changes in the pressure and/or temperature of the air flowing to the engine arranged to adjust the flow through said restriction independently of said governor and whereby the governor components including said spring have substantially the same effective travel and assume substantially the same position to maintain a given engine speed at all altitudes.

19. In a fuel supply system for an engine wherein air is conducted under pressure to a burner and resultant expanded gases are utilized in driving a turbine which in turn drives a compressor, a fuel flow passage having therein a chamber provided with an inlet orifice and a movable valve controlling admission of unmetered fuel under pressure to the chamber through said orifice, pressure-responsive means operatively connected to said valve, means for subjecting said pressure-responsive means to a differential pressure varying with variations in the speed of the engine, a fuel metering orifice in communication with said chamber through which fuel is metered to the burner at a rate varying with variations in engine speed, power control means for regulating the metering rate including a manually power member, and means including said first and second-named means for limiting the metering rate to a predetermined value alcng a rising power or acceleration curve irrespective of the rate of movement of said member in a power-increasing direction.

20. In a system for feeding fuel to the burner of a gas turbine engine wherein air is supplied to the burner in relation to the speed of the engine, a fuel conduit for conducting liquid fuel to the burner, said conduit having a fuel feed restriction therein, an orifice in said conduit in series with said restriction, a valve for varying the area of said restriction, a second valve for varying the area of said orifice, a pressure responsive device such as a diaphragm connected to one of said valves, means for subjecting said diaphragm to a differential pressure varying as a function of the differential pressure across said restriction, and means responsive to variations in air pressure and/or temperature for varying the functional relationship between the differential pressure across said diaphragm and the differential pressure across said restriction.

21. A system as claimed in claim 20 wherein means responsive to variations in engine speed are provided for automatically controlling one of said valves.

22. In a fuel feeding device for supplying liquid fuel to the burner of a gas turbine engine, a fuel conduit for supplying fuel to the burner, a metering restriction in the conduit, a valve for variably controlling the flow of fuel through the conduit, diaphragm means connected to the valve and subjected to the drop across the metering restriction tending to urge the valve in a direction to decrease the flow of fuel to the burner, a shaft arranged to be driven by the engine, an element driven by the shaft for creating a force on said diaphragm means varying as a function of engine speed and tending to urge the valve in a direction to increase the flow of fuel to the burner, a member movable between two extreme positions for varying the rate of fuel flow to the burner between maximum and minimum limits, an engine-driven governor having a part connected to said member and movable in one direction by increase in governor speed and spring urged in the opposite direction, and a manually operable means for varying the setting of said spring to selectively determine the operating speed of the turbine.

23. In a fuel feeding device for supplying liquid fuel to the burner of a gas turbine engine, a fuel conduit for supplying fuel to the burner, a metering restriction in the conduit, a fuel passage forming a by-pass around said restriction containing two orifices in series relation, a valve element responsive to variations in the engine air supply pressure and/or temperature for variably controlling one of said orifices, a second valve element responsive to the differential between the pressure in the conduit on the upstream side of the metering restriction and the pressure in the fuel passage between the two orifices for varying the fuel flow to the burner, a member responsive to variations in engine speed for decreasing the fuel flow to the burner when the speed exceeds a predetermined selectable speed, and a manual control for varying the speed responsiveness of said member to thereby select said predetermined speed.

24. In a system for feeding fuel to the combustion chamber of a gas turbine engine, a fuel conduit having a metering orifice therein for metering fuel to said chamber, a metering valve for controlling the area of said orifice, a regulator valve responsive to variations in engine speed for generating a fuel metering head as a function of engine speed, and a pressure sensitive device responsive to variations in the fuel head for controlling said metering valve.

25. In a system for feeding liquid fuel to a gas turbine engine, a fuel supply conduit having a metering restriction therein, a first valve for varying the area of said restriction, a first pressure responsive means for controlling said valve, a second valve for controlling the metering head across said restriction, a second pressure responsive means for controlling said latter valve, power control means adapted to adjust the pressure differential across said second pressure responsive means, and means for subjecting said first pressure responsive means to a measure of the fuel metering head.

26. In a system for feeding liquid fuel to a gas turbine engine, a fuel supply conduit having a metering restriction therein, a metering valve for varying the area of said restriction, a first pressure responsive means for positioning said valve, another valve for regulating the fuel metering head, a second pressure responsive means connected to said latter valve, a third valve arranged to regulate the pressure differential across said second pressure responsive means, power control means for adjusting said third valve, and means for subjecting said first pressure responsive means to a measure of the fuel metering head.

FRANK C. MOCK.

REFERENCES CITED

The following references are of record in the file of this patent:

UNITED STATES PATENTS

| Number | Name | Date |
|---|---|---|
| 940,813 | Koch | Nov. 23, 1909 |
| 1,312,899 | Esnault-Pelterie | Aug. 12, 1919 |
| 1,822,047 | Leask | Sept. 8, 1931 |
| 2,223,381 | Mock | Dec. 3, 1940 |
| 2,263,705 | Seippel | Nov. 25, 1941 |
| 2,305,311 | Jendrassik | Dec. 15, 1942 |
| 2,345,402 | Lubbock et al. | Mar. 28, 1944 |
| 2,353,929 | Ray | July 18, 1944 |
| 2,368,179 | Turpin | Jan. 30, 1945 |
| 2,374,844 | Stokes | May 1, 1945 |
| 2,422,808 | Stokes | June 24, 1947 |

FOREIGN PATENTS

| Number | Country | Date |
|---|---|---|
| 429,682 | Great Britain | June 4, 1935 |
| 560,196 | Great Britain | Mar. 24, 1944 |